United States Patent [19]

Hulsey

[11] Patent Number: 4,568,229
[45] Date of Patent: Feb. 4, 1986

[54] DRILL TIP AND FASTENER EMPLOYING SAME

[75] Inventor: Tommy R. Hulsey, Wyomissing, Pa.

[73] Assignee: Construction Fasteners, Inc., Wyomissing, Pa.

[21] Appl. No.: 720,477

[22] Filed: Apr. 8, 1985

Related U.S. Application Data

[63] Continuation of Ser. No. 492,609, May 9, 1983, abandoned.

[51] Int. Cl.⁴ ............................................. F16B 25/00
[52] U.S. Cl. .................................. 411/387; 408/227; 408/230
[58] Field of Search ............... 411/387; 408/219, 220, 408/224, 225, 230, 205, 227; 144/219; 145/116 R; 72/71, 112

[56] References Cited

U.S. PATENT DOCUMENTS

| 2,956,470 | 10/1960 | Knohl | 411/387 |
| 3,207,023 | 9/1965 | Knohl | 411/387 |
| 3,207,024 | 9/1965 | Sommer | 411/387 |
| 3,221,588 | 12/1965 | Wieber | 411/387 |
| 3,463,045 | 8/1969 | Prescott | 411/387 |
| 3,524,378 | 8/1970 | Wieber | 411/387 |
| 4,231,692 | 11/1980 | Brabetz et al. | 408/230 |
| 4,477,217 | 10/1984 | Bonacorsi | 411/387 |

FOREIGN PATENT DOCUMENTS

| 247297 | 5/1963 | Australia | 411/387 |
| 369870 | 2/1983 | Austria | 411/387 |
| 1008781 | 5/1952 | France | 411/387 |

Primary Examiner—Z. R. Bilinsky
Attorney, Agent, or Firm—Albert L. Free

[57] ABSTRACT

A drill screw having primary and secondary cutting edges on opposite sides of its longitudinal axis, with the primary cutting edge offset so that it contacts the work-piece first, at a position displaced laterally from the screw axis, and produces initial very rapid drilling of an opening through the work-piece, followed by a period of drilling by both cutting edges. A conical portion is also preferably provided on the screw which extends divergingly from the cutting edges toward the head end of the screw until its diameter matches the root diameter of the screw.

4 Claims, 8 Drawing Figures

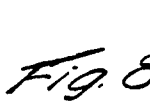
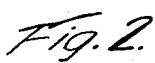
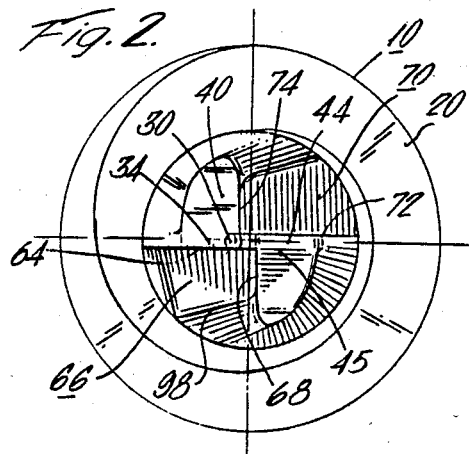
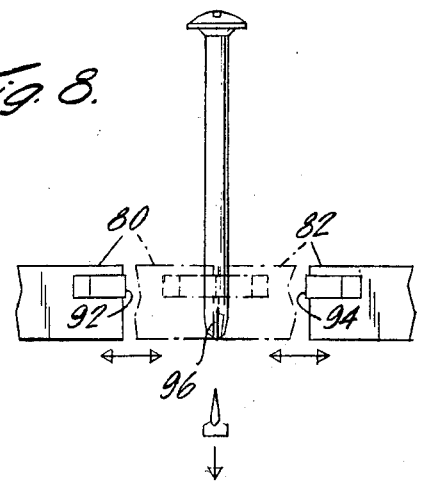
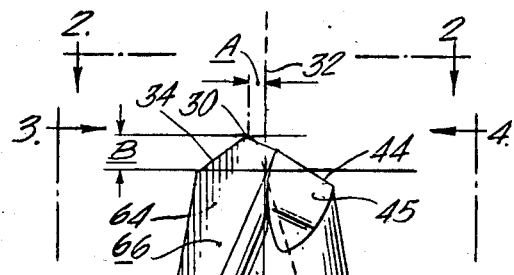
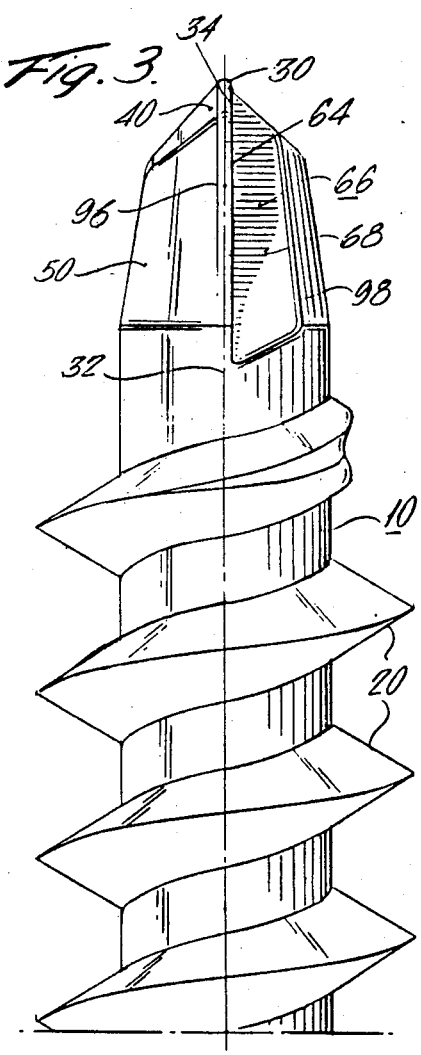
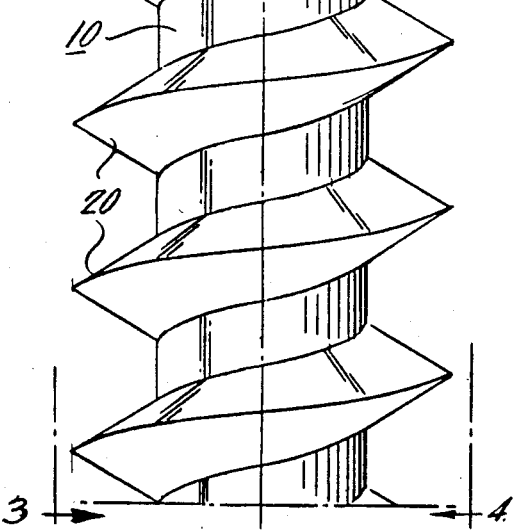

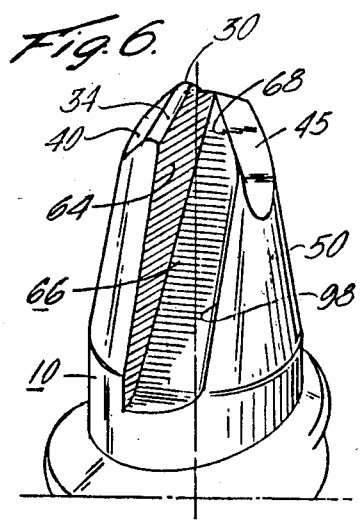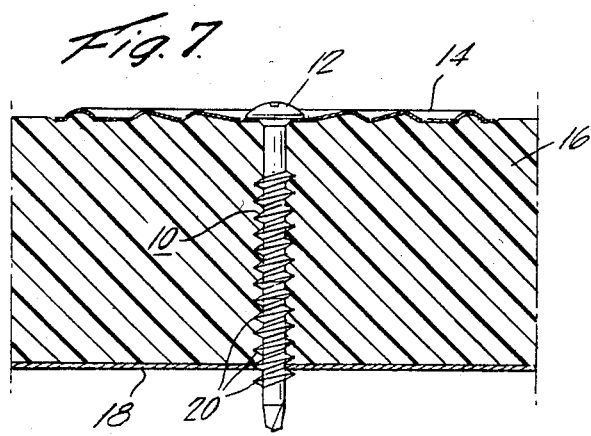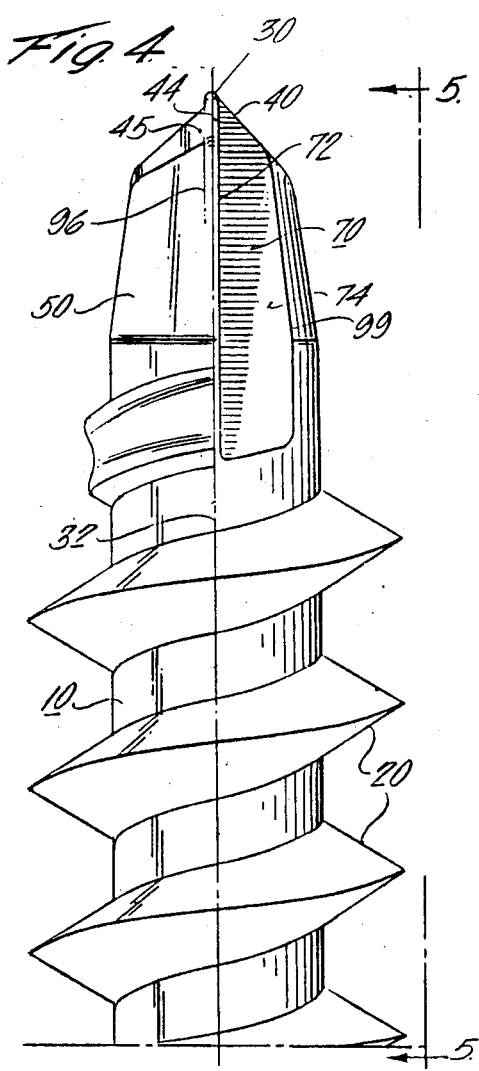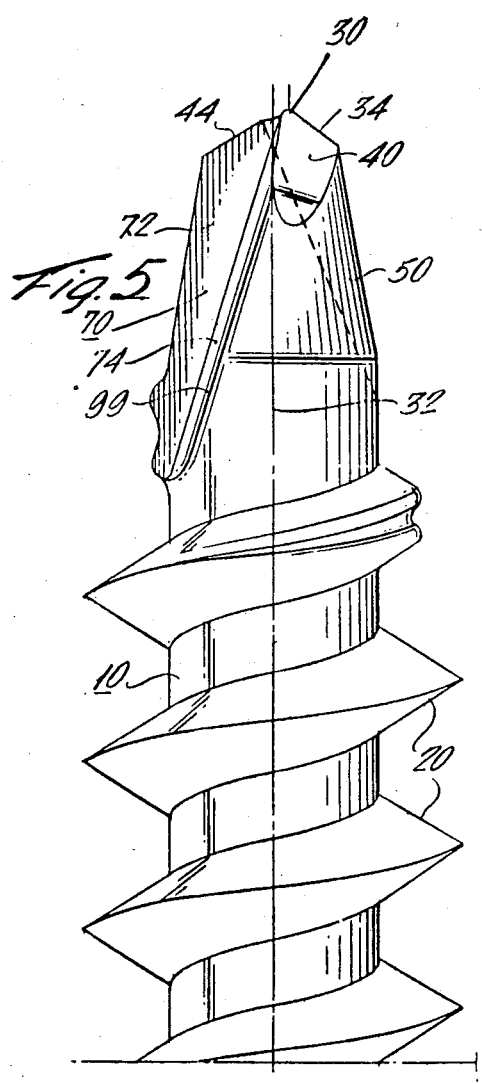

DRILL TIP AND FASTENER EMPLOYING SAME

This is a continuation of application Ser. No. 492,609, filed on May 9, 1983, now abandoned.

This invention relates to drill tips and to fasteners employing same; it relates especially to drill screws suitable for use in holding insulation to the walls or roofs of buildings using metal decks and walls.

BACKGROUND OF THE INVENTION

There are a variety of applications in which it is desired to form an opening through a sheet of metal, rapidly and without requiring excessively large pressures. It is often desirable to do this in conjunction with the insertion of a threaded drill screw into the opening so formed in the work-piece.

For example, in the building construction industry it is often desirable to secure material, such as thermal insulation, to the sheet metal which forms the walls or roofs of metal buildings. To do so, it is common to employ a so-called drill screw which, when rotationally driven by a drill tool, pierces the insulation and sheet metal and then screws itself into and partially through the hole formed in the sheet metal, until a large washer-like plate under the head of the drill screw is pulled tightly against the exterior of the insulation to secure it in place.

The sheet metal used for this purpose is usually of #18 to #26 gauge steel, corresponding to sheet thicknesses of from about 0.050 to 0.030 inch. While steel sheet having a thickness near the lower end of this range (e.g. #22 gauge) can usually be drilled and the drill screw inserted and seated quite easily and quickly, the time and force necessary to insert a drill screw properly in thicker steel, e.g. #18 gauge steel, are often much greater than is desirable, and with some drill screws this cannot be accomplished at all.

One type of drill screw which has been employed for such purposes is similar to that shown in U.S. Pat. No. 3,221,588 of G. L. Wieber issued Dec. 7, 1965. While such a drill screw will generally pierce the steel sheet and seat itself in #22 gauge steel in about 3 to 4 seconds with an applied force of about 30 pounds, in the case of #18 gauge steel it may more typically require about 6 to 8 seconds, and in some cases it may not succeed in piercing the metal at all.

Accordingly, it is an object of the present invention to provide a new and useful drill tip and a fastener employing same.

Another object is to provide a drill tip and drill screw employing same which operate quickly and well, even in relatively thick steel sheets.

SUMMARY OF THE INVENTION

These and other objects of the invention are achieved by the provision of a drilling device comprising a shaft having a driving end adapted to be rotationally drive to rotate the shaft about its longitudinal axis, a drill tip formed on said shaft at the end thereof opposite from the driving end, and a conical portion extending from the drill tip and diverging outwardly to merge at its larger end with the main shaft. The drill tip comprises an initial work-piece contacting end portion which is displaced to one side of the axis, and a back-relieved primary cutting edge defined by a first slot in said drill tip and extending obliquely outwardly from said end portion on said one side of said axis, so as to provide initial rapid, eccentric drilling of the work-piece by the primary cutting edge.

Also provided is a back-relieved secondary cutting edge defined by a second slot in the drill tip and extending obliquely outwardly with respect to said axis on the opposite side of said axis from said primary cutting edge, so as to assist in drilling the work-piece after drilling has been started by the primary cutting edge.

The conical portion is preferably symmetrical with respect to the longitudinal axis, and extends from the portion of the drill tip containing the primary and secondary cutting edges divergingly toward the driven end of the screw, so that the conical portion serves to enlarge the opening made in the work-piece by the primary and secondary cutting edges as the drilling device is rotated and forced further into the opening.

Preferably the conical portion diverges outwardly and terminates at the diameter of the adjacent shaft, and when the device is a drill screw having threads on the shaft, the conical portion preferably diverges outwardly to and terminates at the root diameter of the threads on the shaft. In the preferred form, each of the slots extends substantially throughout the length of the drill tip, and each slot defines a pair of slot faces extending substantially radially and substantially at right angles to each other.

With this arrangement, drilling an appropriate enlargement of the opening in the work-piece may be accomplished as much as ten times faster than with other commercially used drilling tips, without requiring additional pressure during the drilling operation. This makes it possible, for example, for one installing thermal insulation on the exterior of a metal building to pass the tip of the drill screw through the insulation and the underlying sheet metal, and to thread the screw into the thus formed opening and bring the washer-like plate tightly down against the insulation, easily and very quickly, thus saving time of installation and making the job of the installer much easier.

BRIEF DESCRIPTION OF FIGURES

These and other objects and features of the invention will be more readily understood from a consideration of the following detailed description, taken in connection with the accompanying drawings, in which:

FIG. 1 is a front elevation view of a drill screw embodying the present invention, with the portion of the screw adjacent the driven or head end omitted for convenience and exposition;

FIG. 2 is a top view of the screw of FIG. 1, taken along lines 2—2 of FIG. 1;

FIG. 3 is a side view of the screw of FIG. 1, as viewed along lines 3—3 of FIG. 1;

FIG. 4 is a side view of the device of FIG. 1, taken along lines 4—4 of FIG. 1;

FIG. 5 is a side view of the device of FIG. 4, taken along lines 5—5 of FIG. 4;

FIG. 6 is a perspective view of the drill tip of the device shown in the other figures;

FIG. 7 is a vertical sectional view showing an assembly of thermal insulation, roof decking, fastener and holding plate, illustrating one particular use of a drill screw made according to the present invention; and FIG. 8 is a front view of a headed cylinder and a pair of opposed dies which are brought together to form the drill point shown in the other figures.

DESCRIPTION OF SPECIFIC EMBODIMENTS

Referring now to the embodiment of the invention specifically shown in the drawings by way of example, in FIG. 7 a drill screw 10 having a driving head 12 extends through a holding plate 14 of metal or plastic, and urges the latter plate against the upper surface of a layer of thermal insulation 16 so as to secure it tightly to an underlying steel sheet 18 constituting a portion of the roof of a metal building. The screw is held securely to the metal sheet 18 by the threads 20 of screw 10, which engage in a corresponding opening in sheet 18 which has been formed by the drilling action of the screw as it was installed. That is, with the insulation in place the installer places the screw 10 in a rotary drilling device and presses the working tip of the screw against the top of the insulation with the plate 14 in position under the head 12; with the drilling tool turned on, the operator then presses directly downwardly normal to sheet 18, so that the screw drills its way through the layer of insulation and through the underlying metal sheet 18 until plate 14 is clamped tightly against the upper surface of thermal insulation 16 and the screw held by engagement of the threads 20 in the opening of plate 18 as mentioned above. While the drill tip of the invention, and the drill screw embodying it, represent particularly effective embodiments of the present invention, the invention may be embodied in other devices where appropriate.

Referring now to the other figures, it will be seen that the extreme forward end 30 of the drill tip which first engages the work-piece during the drilling operation is displaced laterally on one side of the longitudinal axis 32 of the screw, by the distance A. This initially-contacting end portion represents the beginning of a primary cutting edge 34 which extends obliquely outwardly from the end portion 30 as shown in FIG. 1, for example, and is back-relieved to provide an effective cutting operation, as shown by the back-relief area 40 in FIG. 6, for example.

Upon initial contacting of the rotating end portion 30 of the screw with the work-piece, the laterally displaced end portion 30 rotates eccentrically, i.e. at a position displaced from the axis of rotation 32, an action which has been found to provide extremely rapid cutting of the metal and perforation thereof in a very short period of time. Typically, the depth B of the end portion 30 for which the primary cutting edge alone is providing the cutting action may be slightly larger than the thickness of the sheet metal being cut, so that perforation is accomplished during the eccentric drilling operation. From that point onward, both the primary cutting edge 34 and a secondary cutting edge 44 are operative to accomplish enlargement of the opening by cutting. Cutting edge 44 is on the opposite side of the longitudinal axis from cutting edge 34, and is provided with back-relief 45.

The conical portion 50 of the drill tip extends from the ends of the cutting edges positioned nearest the head end of the screw to the adjacent end of the cylindrical portion of the shaft of the screw. That is, the conical portion diverges from the ends of the primary and secondary cutting edges until it reaches a diameter substantially equal to that of the shaft. In this case, in which the shaft is threaded, the diameter achieved by the diverging conical portion is preferably substantially equal to the root diameter of the screw.

The primary cutting edge 34 is formed not only by the back-relief portion but also by the substantially planar face 64 of slot 66, the other face 68 of which slot lies in the plane substantially at right angles to face 64. Similarly, the secondary cutting edge 44 is formed by the planar face 72 of a slot 70, the other face 74 of which slot is substantially at right angles to face 72.

In operation then, as described above the screw is rotated and urged against the work-piece; the off-center end of the drill tip accomplishes initial extremely rapid drilling and perforation of the work-piece, after which the primary and secondary cutting edges both cut so as to enlarge the hole; the conical portion of the screw thereafter causes a further widening of the hole to the desired diameter of the shaft of the screw, primarily by a reaming or extruding type of widening action.

As an example of the efficacy of the device of the invention, screws of the general type known in the prior art and described in the above-identified patent typically require about 3 seconds to about 4 seconds to drill through and seat properly when the metal sheet being drilled is #18 gauge steel of the type commonly used for metal buildings; with the device of the invention, on the other hand, such drilling and seating of the screw is typically accomplished in from about 0.5 to 0.8 seconds in the specified #18 gauge material.

The drill screw shown may be made by conventional techniques. Thus, a cylindrical shaft having a conventionally formed head thereon may, as shown in FIG. 8, be positioned between a pair of dies 80 and 82 in a pinch-pointing machine such that the two dies are automatically banged together to form the desired point; extra material extruded from the two halves of the dye will generally fall off by itself, but if not may be readily broken off. The shape of the cavities in the dies of course corresponds to the desired external shape of the drill tip. In the preferred form of the invention, the two surfaces 92 and 94 of the dies are positioned so that they strike each other, and prevent further closing of the dies toward each other, before the remainder of the dies strike each other, thereby leaving a narrow web such as 96 between the two formed halves of the drill tip. The drill screw is thereafter heat treated in conventional manner to harden it.

Because of the increased speed of operation of the drill screw, an operator who is, for example, installing thermal insulation on the roof of a metal building may acomplish his task much more quickly, and much more easily.

In one representative example of a drill screw in accordance with the present invention, a headed screw blank 0.157 in diameter is pinch-pointed between the two dies to form the drill tip. The end portion 30 of the drill tip is centered about $0.010 \pm 0.005$ inch from the longitudinal axis 32 of the screw blank. Both the primary and the secondary cutting edges are at 60° to the axis 32. The conical portion extends at an angle of 12.5° to the axis 32, and the slot edges 98 and 99 extend at 22.5° to the axis 32. The length of the primary cutting edge is about 0.035 inch, and of the secondary cutting edge about 0.040 inch. The thickness of the web may be about 0.008 inch. The threads may be rolled after pinch-pointing, with a major diameter of 0.215 inch and a minor diameter of 0.122 inch. The screw material may be carbon steel.

The drill tip configuration of the invention is useful in some cases where there are no threads adjacent the tip, or even no threads at all.

Thus, while the invention has been described with reference to specific embodiments thereof in the interest of complete definiteness, it will be understood that it can be embodied in a variety of forms diverse from those specifically shown and described, without departing from the spirit and scope of the invention as defined by the appended claims.

What is claimed is:

1. A drill device comprising:
   (a) a shaft having a driving end adapted to be rotationally driven to rotate said shaft about its longitudinal axis;
   (b) a drill tip formed on said shaft, comprising
      (1) an initial work-piece contacting end portion which is displaced to one side of said axis;
      (2) a back-relieved primary cutting edge defined by a first slot in said drill tip and extending obliquely outwardly from said end portion on said one side of said axis and at a predetermined first angle with respect to said axis, so as to provide initial eccentric drilling of the work-piece by said primary cutting edge;
      (3) a back-relieved secondary cutting edge defined by a second slot in said drill tip and extending obliquely outwardly at a predetermined second angle with respect to said axis and opposite said primary cutting edge with respect to said axis, so as to assist said primary cutting edge in drilling said work-piece after drilling has been started by said primary cutting edge; and
   (c) a conical portion symmetrical with respect to said axis and diverging in the direction toward said driving end at a third angle to said axis smaller than said first and second angles, said conical portion extending from the portion of said drill tip containing said primary and secondary cutting edges to the diameter of said shaft, whereby said conical portion serves to enlarge the opening made in said work-piece by said primary and secondary cutting edges as said device is rotated and forced further into said opening.

2. The device of claim 1, wherein said device is a drill screw having threads on said shaft and said conical portion diverges outwardly to and terminates at the root diameter of said threads on said shaft.

3. The device of claim 1, wherein each of said slots extends substantially throughout the length of said drill tip.

4. The device of claim 1, wherein each of said slots extends substantially axially of said tip, and each defines a pair of slot faces extending substantially radially and substantially at right angles to each other.

* * * * *